US 6,676,209 B1

(12) United States Patent
Szabo et al.

(10) Patent No.: US 6,676,209 B1
(45) Date of Patent: Jan. 13, 2004

(54) APPARATUS FOR REDUCING ACCIDENTAL DAMAGE TO SEAT MATERIALS

(76) Inventors: Elizabeth M. Szabo, 110 Knarr St., Austin, TX (US) 78734; Karen M. Bolin, 129 Double Eagle Dr., Austin, TX (US) 78738

( * ) Notice: Subject to any disclaimer, the term of this patent is extended or adjusted under 35 U.S.C. 154(b) by 0 days.

(21) Appl. No.: 09/928,955

(22) Filed: Aug. 13, 2001

(51) Int. Cl.$^7$ ................................................ A47C 31/00
(52) U.S. Cl. ............... 297/219.1; 297/229; 297/228.13; 297/188.2; 297/188.01
(58) Field of Search ............................. 297/229, 219.1, 297/228.13, 228.12, 228.11, 228.1, 188.2, 188.01, 188.08, 188.04, 188.06

(56) References Cited

U.S. PATENT DOCUMENTS

| | | | | |
|---|---|---|---|---|
| RE25,537 E | * | 3/1964 | Larkin | ........................... 52/87 |
| 3,298,737 A | * | 1/1967 | Rosenfeld et al. | ..... 297/188.08 |
| 4,886,697 A | * | 12/1989 | Perdelwitz, Jr. et al. | .... 428/192 |
| 4,892,769 A | * | 1/1990 | Perdelwitz et al. | ........... 428/68 |
| 4,927,200 A | * | 5/1990 | Wilkins | ...................... 296/37.8 |
| 5,125,121 A | * | 6/1992 | Wroble | ........................... 5/484 |
| 5,403,066 A | * | 4/1995 | Drum | ...................... 297/219.1 |
| 5,690,384 A | * | 11/1997 | Rossi | ...................... 297/283.1 |
| 5,758,926 A | * | 6/1998 | Wilkie et al. | ........... 297/423.19 |
| 5,771,506 A | * | 6/1998 | Joiner | ......................... 4/575.1 |
| 5,878,672 A | * | 3/1999 | Ostermann et al. | ........... 108/44 |
| 6,089,659 A | * | 7/2000 | Toyota | ................... 297/228.11 |
| 6,102,463 A | * | 8/2000 | Swanson et al. | ......... 296/37.15 |
| 6,332,651 B1 | * | 12/2001 | Horisawa | ............... 297/452.11 |
| 6,428,098 B1 | * | 8/2002 | Allbaugh | ............... 297/219.12 |

* cited by examiner

Primary Examiner—Peter M. Cuomo
Assistant Examiner—Stephanie Harris
(74) Attorney, Agent, or Firm—Szabo, et al.; Kevin R. Imes

(57) ABSTRACT

An apparatus for protecting seat material includes a reversible cover operable to protect a vehicle seat. The cover includes a first side, a second side coupled to the first side, and a storage compartment coupled to the first side and positioned along a upper portion of the reversible cover. The reversible cover further includes at least one support element coupled to the first side and the second side and operable to provide vertical support of the reversible cover. The reversible cover further includes a removable storage compartment that may be used internal and external to a vehicle.

10 Claims, 4 Drawing Sheets

FIG. 2A
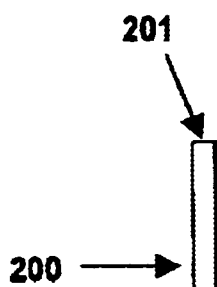
FIG. 2B
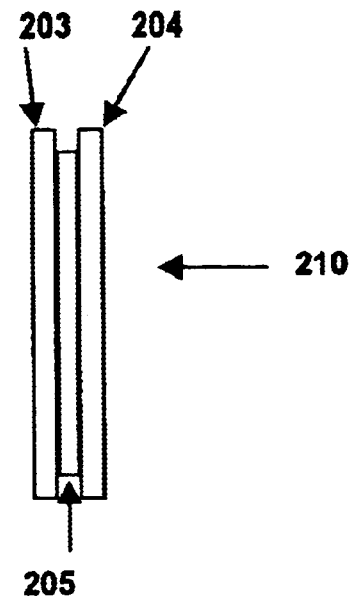
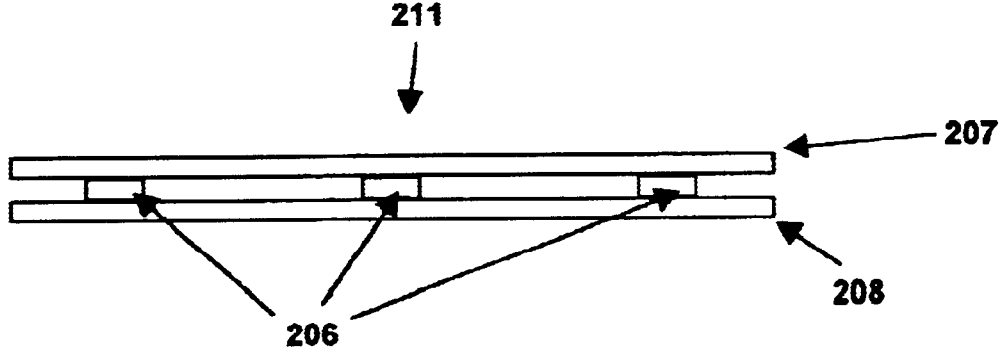
FIG. 2C

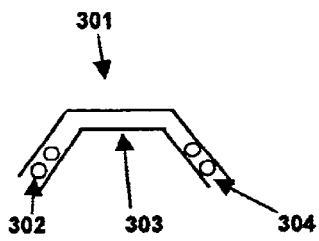
FIG. 3A
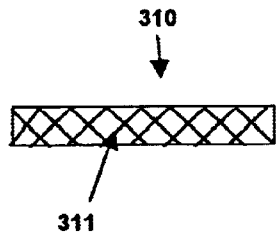
FIG. 3B
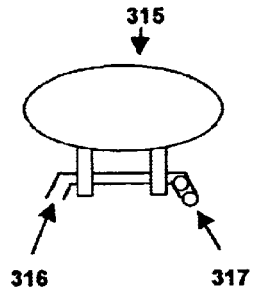
FIG. 3C
FIG. 5
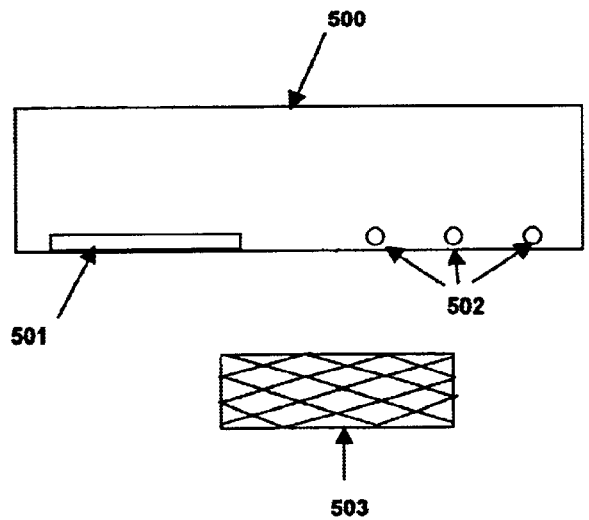

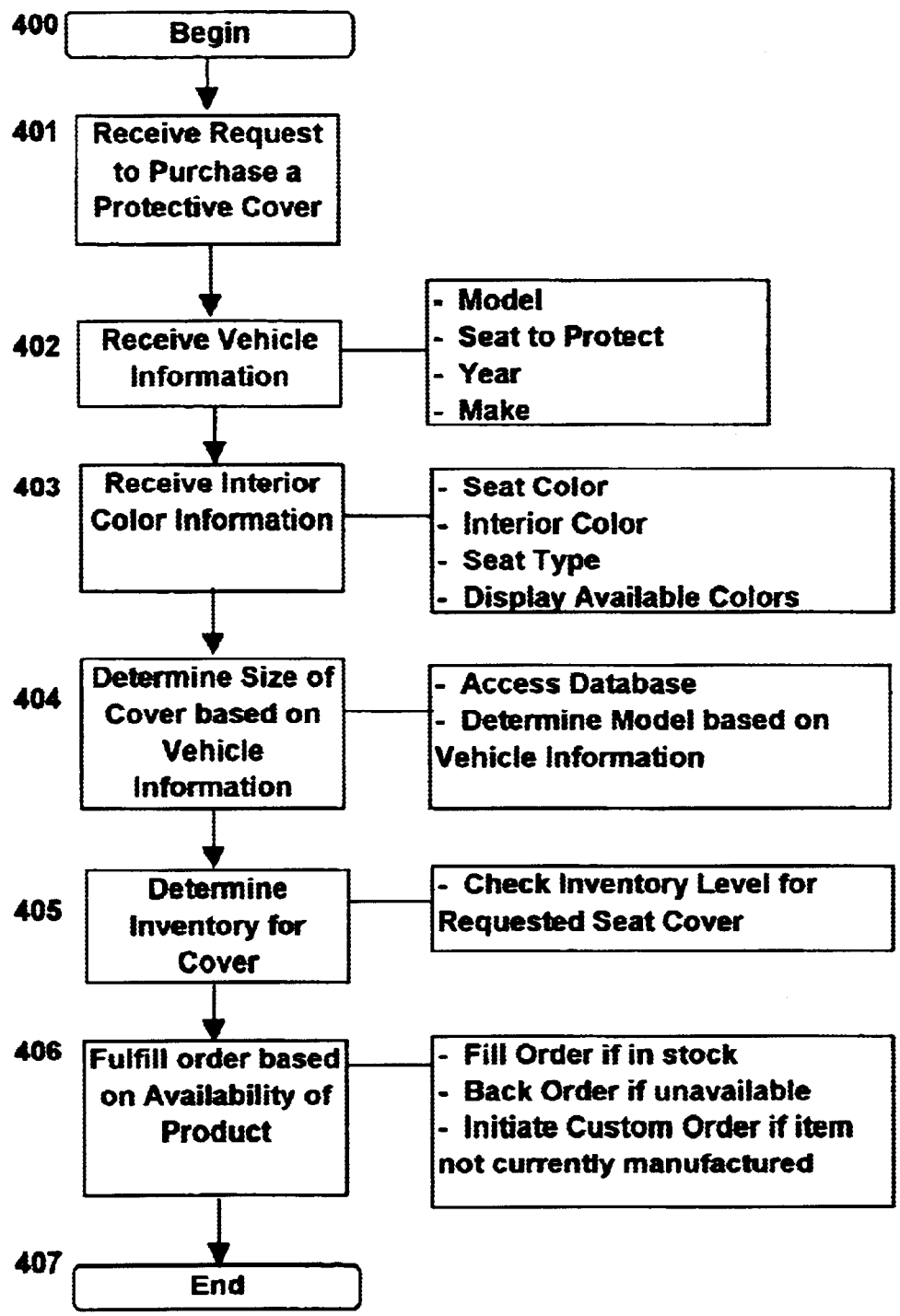

APPARATUS FOR REDUCING ACCIDENTAL DAMAGE TO SEAT MATERIALS

TECHNICAL FIELD

The present invention generally relates to fabric protection, and more particularly, to an apparatus for reducing accidental damage to seat material.

BACKGROUND OF THE INVENTION

There are some basic risks to automobile owners having children that use car seats. For example, increased wear on an automobile's seat can be caused from children accidentally spilling liquids or dropping food onto an automobile's seat. Candy and gum can be dropped onto a seat and leave permanent damage to the seat's material. Additionally, liquids such as milk or formula can leave a pungent odor within a vehicle and lead to undesired bacteria growth. Further, increased wear damage to a seat's material may be realized leading to a need to replace or repair such materials.

Such mishaps can leave an automobile owner with having to repeatedly clean a vehicle's seat depending on the type of spill. For example, some automobile owners may have an added expensive of having a seat professionally cleaned to remove stubborn stains or food articles that can not be easily removed.

One current solution for containing mishaps includes placing a towel or cloth across a portion of a car seat to catch spills and mishandled foods. However, most towels are not large enough to protect a seat and can move out of place during travels. Additionally, a towel or cloth placed over a seat may limit access to seat belts for securing passengers and/or child safety seats. Even more, a towel or cloth may not provide protection against abrasive items, such as a child's safety seat, and may lead to wholes or chaffing of an automobile's seat material. From the above discussion it should be apparent that there is a need for a protective device for reducing accidental damage to fabrics or materials.

SUMMARY OF THE INVENTION

In accordance with teachings of the invention, an apparatus for reducing accidental damage to seat material is disclosed. According to one embodiment of the invention, an apparatus includes a protective cover having a layer of material for covering a portion of a seat to protect the seat and a coupling element operable to couple the protective cover to a portion of the seat. The apparatus further includes at least one support element coupled to a portion of the material to provide vertical support of the material to cover a portion of the seat.

According to another embodiment of the invention, an apparatus for providing protection to a material associated with a vehicle seat is provided. The apparatus includes a protective material operable to be coupled to a portion of a vehicle seat and includes at least one layer operable to protect the vehicle seat. The apparatus further includes a removable storage compartment coupled to a portion of the protective material and operable to store articles.

According to a further embodiment of the invention, an apparatus for providing protection to material associated with a vehicle seat is disclosed. The apparatus includes a protective cover including a first layer having an upper portion associated with protecting an upper portion of a vehicle seat. The apparatus further includes a storage compartment coupled to the upper portion of the first layer and positioned substantially medial along the upper portion of the protective cover. The apparatus includes a second layer coupled to the first layer and the second layer including a color substantially similar to an interior portion of a vehicle.

According to another embodiment of the invention, a reversible cover operable to protect a vehicle seat is provided. The reversible cover includes a first layer and a second layer and a storage compartment coupled to the first layer and positioned along an upper portion of the reversible cover. The cover further includes at least one support element including a fiberglass-like material and coupled to the first layer and the second layer and operable to provide vertical support of the reversible cover. The cover includes a removable storage compartment operable to store articles and an adsorption material coupled to the first and second layers to adsorb liquid incident to at least on the layers.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2A illustrates a side perspective view of a portion of a protective cover according to one embodiment of the invention;

FIG. 2B illustrates a side perspective view of a portion of a protective cover having support elements according to one embodiment of the invention;

FIG. 2C illustrates a top perspective view of a portion of a protective cover having support elements according to one embodiment of the invention;

FIGS. 3a–3c illustrates coupling elements for use with a protective cover according to one embodiment of the invention;

FIG. 4 illustrates a flow diagram of a method for ordering a protective cover according to one embodiment of the invention; and FIG. 5 illustrates a removable storage compartment coupled to a portion of a protective cover for housing articles according to one embodiment of the invention.

DETAILED DESCRIPTION OF THE INVENTION

Figure 1:
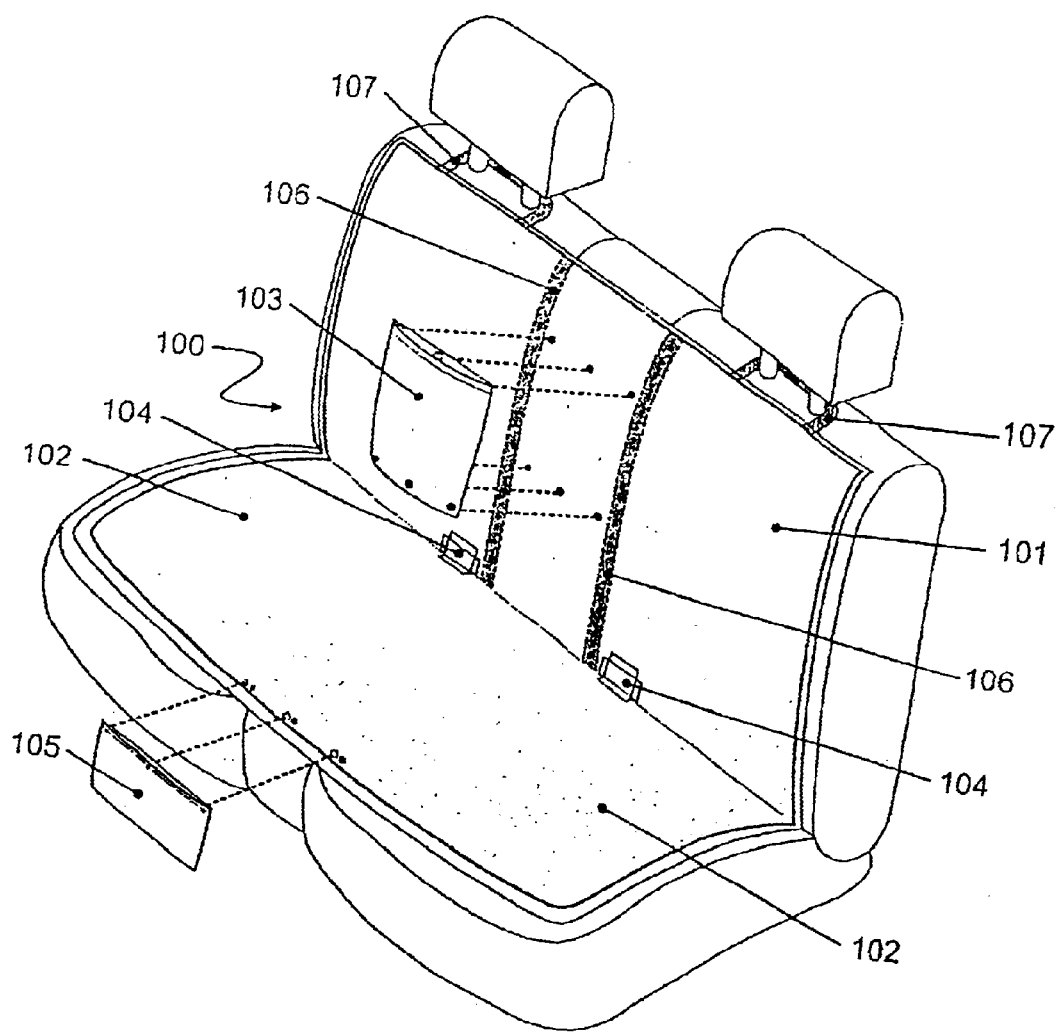
FIG. 1 illustrates a cover for protecting a vehicle seat according to one embodiment of the invention.

Advantageous embodiments of the invention include providing an apparatus for protecting seat material. An apparatus includes a protective cover for use with vehicle seats, furniture such as chairs sofa's, loveseats, or other objects, furniture, etc. that may need protection from undesired elements.

FIG. 1 illustrates a cover for protecting a vehicle seat according to one embodiment of the invention. A protective cover, illustrated generally at 100, includes an upper portion 101 coupled to a lower portion 102 having plural conduits 104 for allowing passage of a safety connector (not expressly shown). Upper portion 101 and lower portion 102 may include one or more materials for providing protection of a seat and may include, but are not limited to, vinyl, felt, leatherette, rubber, elastic materials, fabrics, foam, plastics, butting filler, fiberglass-like and/batten material, padding material, thatch material or other materials that may be used in association with providing a protective cover.

Protective cover 100 further includes coupling elements 107 for coupling protective cover 100 to a vehicle seat. One or more types of coupling mechanisms may be employed by coupling elements 107. For example, coupling elements 107 may include a strap with snaps for coupling to a portion of a safety restraint, a strap material with a Velcro-like material for coupling to a portion of a vehicle operable to couple Velcro-like material, a strap material that may include snaps for coupling a portion of protective cover 100 to a headrest, a drawstring coupled to portions of protective cover 100, and/or an elastic material that may include a hook for coupling protective cover 100 to a portion of a car seat. Other coupling mechanisms, materials, devices, etc. may be used to couple protective cover 100 to a vehicle seat.

In one embodiment, protective cover 100.may be made of machine washable materials thereby allowing a user to clean a surface upon the surface becoming dirty, soiled, etc. For example, protective cover 100 may include a felt material with a vinyl backing that may be machine washable. In this manner, protective cover 100 may be removed from a vehicle, cleaned, and reused as needed.

In another embodiment, protective cover 100 may include a puncture resisting material for reducing damage that may result from sharp objects that may penetrate an unprotected surface of a vehicle seat. For example, protective cover 100 may include one or more layers of material that are substantially resilient in terms of reducing punctures and may be provided at a thickness for reducing such mishaps.

In another embodiment, protective cover 100 may include more than one layer of material and may be operable as a reversible protective cover. For example, protective cover 100 may include a first side that may be used in association with transporting children, materials, plants, pets, or other objects, devices, etc. that may accidental damage a vehicle seat. In a similar manner, protective cover 100 may include a second or reverse side having a color and/or texture substantially similar to an interior portion of a car. For example, a second side may include a leatherette material similar to a leather interior of a vehicle. In this manner, a vehicle operator may reverse protective cover 100 based on a desired use.

In one embodiment, protective cover 100 may include a non-slip material for reducing movement of protective cover 100 during use. For example, protective cover 100 may include a first side having a material that includes a high relative coefficient of friction to reduce slippage during use. For example, one advantageous embodiment may include providing a first material, such as a rubber-like material, that may be used adjacent to a vehicle seat for reducing movement of protective cover 100.

Protective cover 100 further includes one or more support elements 103 for maintaining protective cover 100 formed. For example, support elements 106 may be coupled to upper portion 101 in a vertical position for maintaining upper portion 101 in an upright position with minimal sagging or deformation of material used with protective cover 100. In this manner, protective cover 100 may be maintained in a position and a reduction in strain placed on coupling elements 107 may be realized.

Protective cover 100 further includes a first storage compartment 103 coupled to upper portion 100 for housing articles that may be accessed by one or more individuals seated within a vehicle seat associated with protective cover 100. Additionally, lower portion 102 includes a second storage compartment operable for storing articles.

In one embodiment, first and/or second storage compartment 103/105 may be a removable storage compartment for storing articles and may be securely fastened to protective cover 100 and conveniently removed and used as a carry bag or portable storage device upon exiting a vehicle. For example, protective cover 100 may be used in association with a children's safety chair for transporting a child within a vehicle. In this manner, a user may include articles such as diapers, food, formula, wipes, toys, etc. and may securely fasten second storage compartment 105 to protective cover 100 while within a vehicle or detach and carry second storage compartment 105.

In another embodiment, first storage compartment 103 may be located such that articles may be easily accessed by a passenger. For example, a small child may be retrained within a child seat using a safety protection device such as a child's safety seat. As such, first storage compartment 103 may include children's articles such as toys, pacifiers, teething rings, formula, or other articles or objects that a child may want access.

FIG. 2A illustrates a side perspective view of a portion of a protective cover according to one embodiment of the invention. Protective cover 200 includes a first layer 201 coupled to a second layer 202 to form protective cover 200 operable to be used in association with protecting a material from undesired damage. First layer 201 and second layer 202 may be coupled using one or more techniques such as sewing, heat shrinking, gluing, stapling, or other coupling methods that may be used to create a protective cover having a first and second layer. In one embodiment, first layer 201 includes a protective layer such as a vinyl for resisting penetration of liquids. Other materials may also be used to provide protection. For example, in one embodiment, second layer 202 may include a water resisting material that may be sprayed onto first layer 201 to provide protective cover 200. Some spray on materials (e.g. scotch guard, silicon based materials, etc.) may be applied in a liquid or semi-liquid state to first layer 201 and dried to provide a protective layer for protective cover 200.

FIG. 2B illustrates a side perspective view of a portion of a protective cover having supporting elements according to one embodiment of the invention. A protective cover 210 includes a first layer 203, a second layer 204 and a support element 205 coupled to a portion of first layer 203 and second layer 204. Support element 205 may include material having support characteristics for supporting first and second layer 203/204 in a predetermined direction and/or a fiberglass batten-like material for providing vertical support. For example, supporting material may include a foam material preformed into strips and held in place between first layer 203 and second layer 204. Support element 205 may include stitching along a portion of support element 205 to keep support element 205 in a stationary position. Other embodiments may include securing support element 205 using an epoxy, glue or other fastening mechanisms for securing support element 205.

In another embodiment, support element 205 may be formed using first layer 203 and/or second layer 204. For example, one or more of the layers may be densely sown in a specific region to create support element 205. In this manner, a limited number of different materials needed to provide protective cover 210 having support element 205 may be realized.

FIG. 2C illustrates a top perspective view of a portion of a protective cover having supporting elements according to one embodiment of the invention. A protective cover 211 includes a first layer 207, a second layer 208, and plural support elements 206 for supporting protective cover 211. For example, protective cover 211 may be used in association with upper portion 106 of FIG. 1 for providing vertical support for protective cover 100. In this manner, vertical support of protective cover 100 may be provided thereby reducing strain placed on a fastening mechanism associated with protective cover 100 while maintaining protective cover in desired position.

In another embodiment, protective cover 200, 210, 211 may include additional layers of material for providing protection. For example, an adsorption material may be provided between first material 201 and second material 202 for adsorbing moisture that may become incident to first layer 201 and/or second layer 202. As such, the adsorption material may adsorb moisture away from an incident layer when a mishap occurs.

FIGS. 3a–3e illustrates coupling elements for use with a protective cover according to one embodiment of the invention. First coupling element 301 includes a strap 303 with snaps 302/304 for coupling a protective cover to a portion of a safety restraint (not expressly shown). First coupling element 301 may be used to wrap around a portion of a safety restraint and snap in place using the one or more of snaps 302/304.

In another embodiment, coupling element may include a strap material 310 with a Velcro-like material 311 may be used to couple a protective cover to a portion of a vehicle. For example, Velcro-like material 311 may be coupled to a rear deck of a vehicle (not expressly shown) that may include a material (i.e. carpet, fabric, Velcro) operable to couple with a Velcro-like material and securely fasten a protective cover.

In a further embodiment, coupling element may include a strap material 316 with snaps 317 for coupling a portion of a protective to a headrest 315. In this manner, a protective cover may be used in association with seats that may have a headrest.

Although embodiments for coupling a protective seat cover are disclosed, other embodiments for coupling a protective cover to a portion of a vehicle seat may be realized without departing from the scope of the invention. For example, a protective cover may include an edge fastening material such as an elastic material coupled along an edge of a protective cover to securely couple the protective cover to a portion of a vehicle seat. In this manner, a protective cover may be stretched to fit various portions of a vehicle seat.

FIG. 4 illustrates a flow diagram of a method for ordering a protective cover according to one embodiment of the invention. The method begins generally at step 400. At step 401 a request to purchase a protective cover is received via a virtual terminal such as a consumer website or other user interface. Upon receiving a request to purchase a protective cover, the method proceeds to step 402 where vehicle information for a protective cover is received. For example, certain vehicles may have unique details that may need to be accounted for prior to placing an order for a protective cover for a specific vehicle. A rear seat may be a particular size, shape, number/size of headrests, rounded corners, rear decking material (i.e. decking area behind a seat), and/or other information unique to a vehicle.

The method then proceeds to step 403 where the method determines color information for an interior portion of a vehicle. For example, a user may have a vehicle with tan interior and may desire a protective cover with a color substantially similar to tan. In another embodiment, a user may want to view an assortment of colors that may match an interior portion of a vehicle. For example, a user may want to order a reversible seat cover having a particular pattern that matches the interior. As such, a user may select a color and/or pattern for one side of the protective cover and a second color or pattern for a second side of the protective cover.

Upon receiving color information, the method proceeds to step 404 where the method proceeds to determine the size/type of cover to be used based on the vehicle information (i.e. 48" width for a minivan, 54" width for a mid-sized sport utility vehicle, 60" width for a full-sized truck or sport utility vehicle, or other non-standard sizes). For example, a user may request a protective cover for a particular sport utility vehicle. As such, the method would determine which cover to use with the particular model of sport utility vehicle based on the dimensions of a seat for the sport utility vehicle. For example, a user may request a reversible seat cover for use with a front seat with one side having a solid color and a second side having a print or pattern. Other embodiments may include requesting a cover having the same color on each side.

Upon determining the size and color, the method proceeds to determine availability 405 of the requested protective cover. For example, the method may determine a model number associated with the requested cover and check an inventory level based on the model number. In another embodiment, the method may include accessing a relational database to determine availability of a product based on the size and color of a product thereby reducing the need to determine a model number. Other embodiments may also be used for determining availability of a product.

Upon determining availability of a product, the method proceeds to step 406 and the order is processed based on availability of the requested protective cover. For example, if a protective cover is available, the method fills the order and initiates shipping the protective cover to the requesting user using the users shipping information (not expressly shown). If the protective cover is not in inventory, the method would proceed to backorder the product for the user. In one embodiment, if a protective cover is not currently being manufactured, the method may initiate a request for a custom protective cover to be built. Upon processing the order, the method proceeds to step 407 where the method ends.

FIG. 5 illustrates a removable storage compartment coupled to a portion of a protective cover for housing articles according to one embodiment of the invention. A protective cover, illustrated generally at 500, includes a first coupling material 501 for use with a removable storage compartment 503. Protective cover 500 may be a lower portion of a protective cover or other portions of a protective cover. Removable storage compartment 503 may be coupled to protective cover 500 using coupling material 501 that may include a Velcro-like material or other coupling mechanisms. For example, coupling elements 502 may be used to couple removable storage compartment 503 to a portion of protective cover 500 and may include, but are not limited to, snaps, hooks, Velcro-like material or other coupling elements that may be used to couple a removable storage compartment to protective cover.

Although the disclosed embodiments have been described in detail, it should be understood that various changes, substitutions and alterations could be made to the embodiments without departing from their spirit and scope.

What is claimed is:

1. An apparatus for protecting a vehicle seat having an upper backrest portion and a lower seat portion, the apparatus comprising:

a reversible cover operable to protect the vehicle seat, the reversible cover including a first side and a reversible side;

a removable storage compartment operable to be coupled to either the first side or the reversible side of an upper portion of the reversible cover, the upper portion operable to cover the upper backrest portion of the vehicle seat;

the removable storage compartment substantially centered along the upper portion of the reversible cover;

at least one vertical support element coupled to the first side or the reversible side to provide vertical support of the reversible cover;

a second removable storage compartment coupled to a bottom portion of the reversible cover, the bottom portion operable to cover the lower seat portion of the vehicle seat; and the second removable storage compartment coupled to a front edge of the bottom portion of the reversible cover and substantially centered along the bottom portion.

2. The apparatus of claim 1 further comprising means for coupling the flexible storage compartment to either the first side and the reversible side of the reversible cover.

3. The apparatus of claim 1 further comprising at least one conduit operable to allow passage of a safety restraint.

4. The apparatus of claim 1 wherein the reversible cover comprises a machine washable material.

5. The apparatus of claim 1 further comprising at least one coupling element operable to securely fasten the protective cover to a portion of the vehicle seat.

6. The apparatus of claim 5 further comprising an hook and loop material operable to securely couple the reversible cover to a portion of the seat.

7. The apparatus of claim 5 wherein the coupling mechanism further comprises a strap material including snaps operable to couple the strap material to a portion of a headrest.

8. The apparatus of claim 1 further comprising a material substantially similar in appearance to the vehicle seat.

9. The apparatus of claim 1 further comprising:

the first side including an adsorbent material visually dissimilar to the vehicle seat; and the reversible side including a material visually similar to the vehicle seat.

10. The apparatus of claim 1 further comprising the removable storage compartment including a mesh material.

* * * * *